United States Patent
Yano et al.

[11] 4,067,638
[45] Jan. 10, 1978

[54] MULTI-COLOR HOLOGRAPHIC STEREOGRAMS

[75] Inventors: Akio Yano; Kazuya Matsumoto, both of Yokohama, Japan

[73] Assignee: Canon Kabushiki Kaisha, Tokyo, Japan

[21] Appl. No.: 609,050

[22] Filed: Aug. 29, 1975

Related U.S. Application Data

[63] Continuation of Ser. No. 450,212, March 11, 1974, abandoned, which is a continuation of Ser. No. 312,728, Dec. 6, 1972, abandoned.

[30] Foreign Application Priority Data

Dec. 8, 1971   Japan .................................. 46-99324

[51] Int. Cl.² .............................................. G03H 1/26
[52] U.S. Cl. ................................................. 350/3.5
[58] Field of Search ...................................... 350/3.5

[56] References Cited

U.S. PATENT DOCUMENTS

| | | | |
|---|---|---|---|
| 3,515,452 | 6/1970 | Pole ......................... | 350/3.5 |
| 3,608,993 | 9/1971 | DeBitetto ................. | 350/3.5 |
| 3,695,744 | 10/1972 | Clay ......................... | 350/3.5 |

*Primary Examiner*—Ronald J. Stern
*Attorney, Agent, or Firm*—Toren, McGeady and Stanger

[57] ABSTRACT

A plurality of multicolored transparencies or pictures having different parallactic views of a scene are aligned with each other and illuminated by red, green, and blue coherent beams. The resulting images are focused on a holographic recording medium through an aperture elongated along the direction of the alignment of the pictures. A hologram is recorded by red, green, and blue coherent reference beams directed at the recording medium. The images are reconstructed with a white reconstructing beam or a reconstructing beam composed of quasi-monochromatic colors and observed through an aperture corresponding to the first aperture and arranged in the same position. The hologram has recorded thereon a focused image hologram of the pictures and a Fresnel hologram of the aperture. The reconstructed image may be expanded by a screen which is directive in one direction, i.e. retroreflective horizontally, and dispersive in another direction, i.e. vertically dispersive.

6 Claims, 5 Drawing Figures

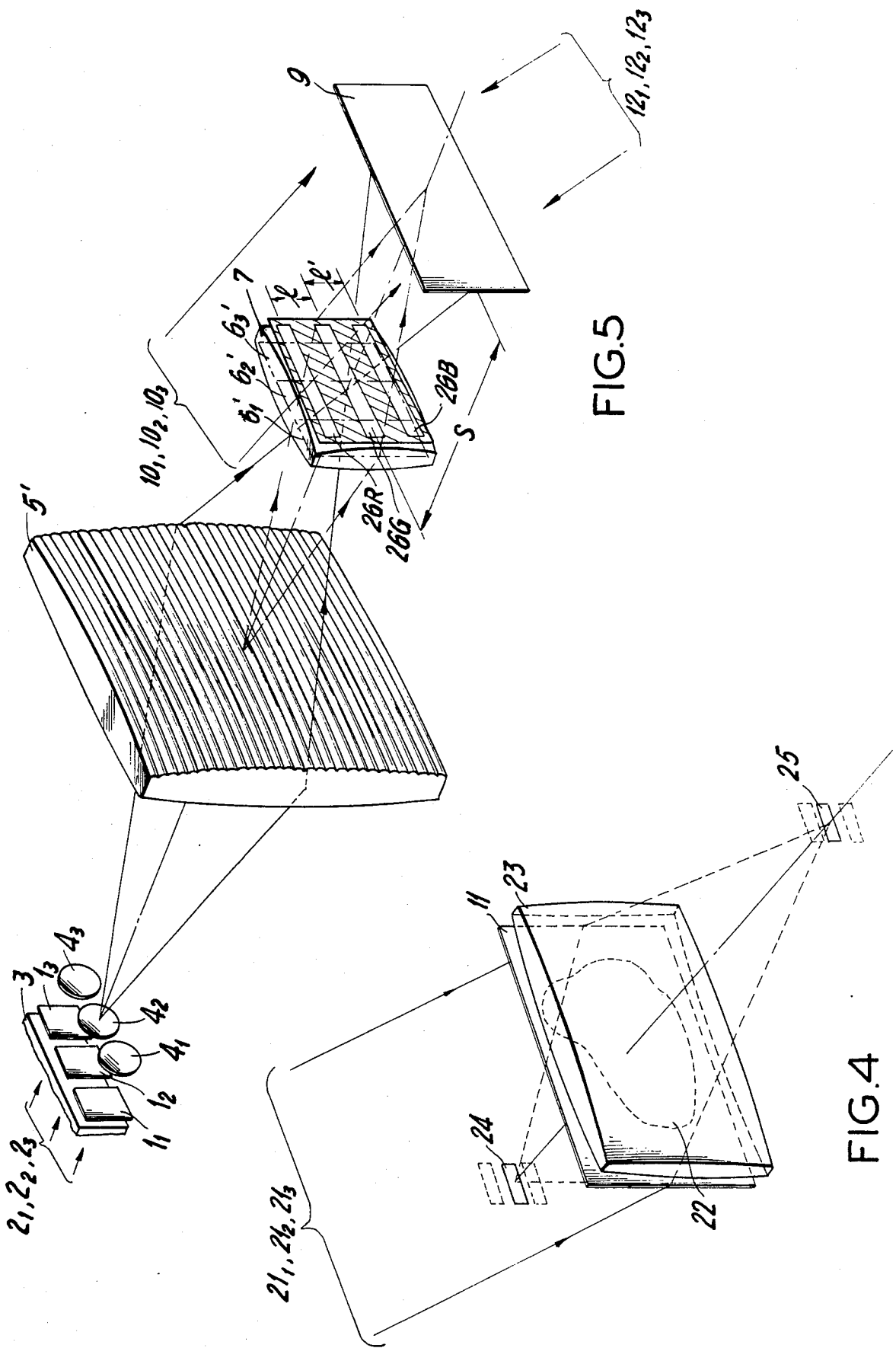

and MULTI-COLOR HOLOGRAPHIC STEREOGRAMS

This is a continuation of application Ser. No. 450,212, filed Mar. 11, 1974 and now abandoned, which in turn is a continuation of application Ser. No. 312,728, filed Dec. 6, 1972 and now abandoned.

BACKGROUND OF THE INVENTION

This invention relates to holograms and particularly to methods for recording and reconstructing multicolor focused image holograms.

U.S. Pat. Nos. 3,535,012 and 3,535,013 describe the recording of holograms by focusing an image of an object at or near the plane of the holographic recording material. The image is reconstructed at or near the plane of the hologram. Such holograms do not require highly monochromatic reconstruction beams such as those available from lasers. Rather, images may be reconstructed with "quasi monochromatic" light from an ordinary white light source.

Multi-color holograms of this type may be recorded with separate red, green, and blue illuminating beams. However, since separate red, green, and blue images are recorded on the holograms in the form of interference fringes, reconstruction of the hologram by multi-color beams produces color images but also produces cross-talk images. For example, a red reconstruction beam reconstructs not only the red image but also two red colored cross-talk images from the recorded green and blue colors. There are two cross-talk images for each color, a total of six cross-talk images are reconstructed. These cross talk images overlap the real reconstructed images, blur them, and deteriorate the color reproduction.

An object of the present invention is to improve the recording and reconstruction of multi-color holograms.

Another object of the invention is to minimize or remove the cross-talk images.

Another object of the invention is to enlarge the observation zone of the real image.

SUMMARY OF THE INVENTION

According to an aspect of the invention a color focused image hologram is recorded by arranging a plurality of two-dimensional multi-color pictures along a predetermined line, illuminating the pictures with different color coherent light beams, projecting the light from the pictures onto a screen which focuses parallel to the predetermined line, transferring a plurality of the projection images formed on the screen to a holographic recording medium, placing a masking member having an elongated aperture between the screen and the medium, orienting the elongated dimension of the aperture parallel to the predetermined line, directing the reference light beams having mutually different wavelengths to the medium so as to create a hologram colored dispersion greater in one direction transverse to the predetermined line in the plane of the hologram than in the direction parallel thereto so that the plurality of two-dimensional pictures are recorded as focused image holograms and the masking member is recorded as a Fresnel hologram. The reconstruction is accomplished by directing different color reconstruction beams toward the hologram so as to reconstruct true color images of the pictures and color cross-modulation images of the pictures, and to reconstruct true color images of the masking member and a color cross-modulation image of the masking member remote from the hologram with the cross-modulation images separate from the true color reconstructed images, and by placing a light blocking member having an elongated aperture to block out the cross-modulation images of the masking member.

These and other features of the invention are pointed out in the claims. Other objects and advantages of the invention will be evident from the following detailed description when read in light of the accompanying drawings.

BRIEF DESCRIPTION OF THE DRAWINGS

In the drawings:

FIG. 4 is a perspective view showing a method of recording and reconstructing a hologram embodying features of the invention.

FIG. 5 is a perspective drawing showing a method for recording and reconstructing a color focused image hologram embodying features of the invention.

DETAILED DESCRIPTION OF PREFERRED EMBODIMENTS

Figure 1:
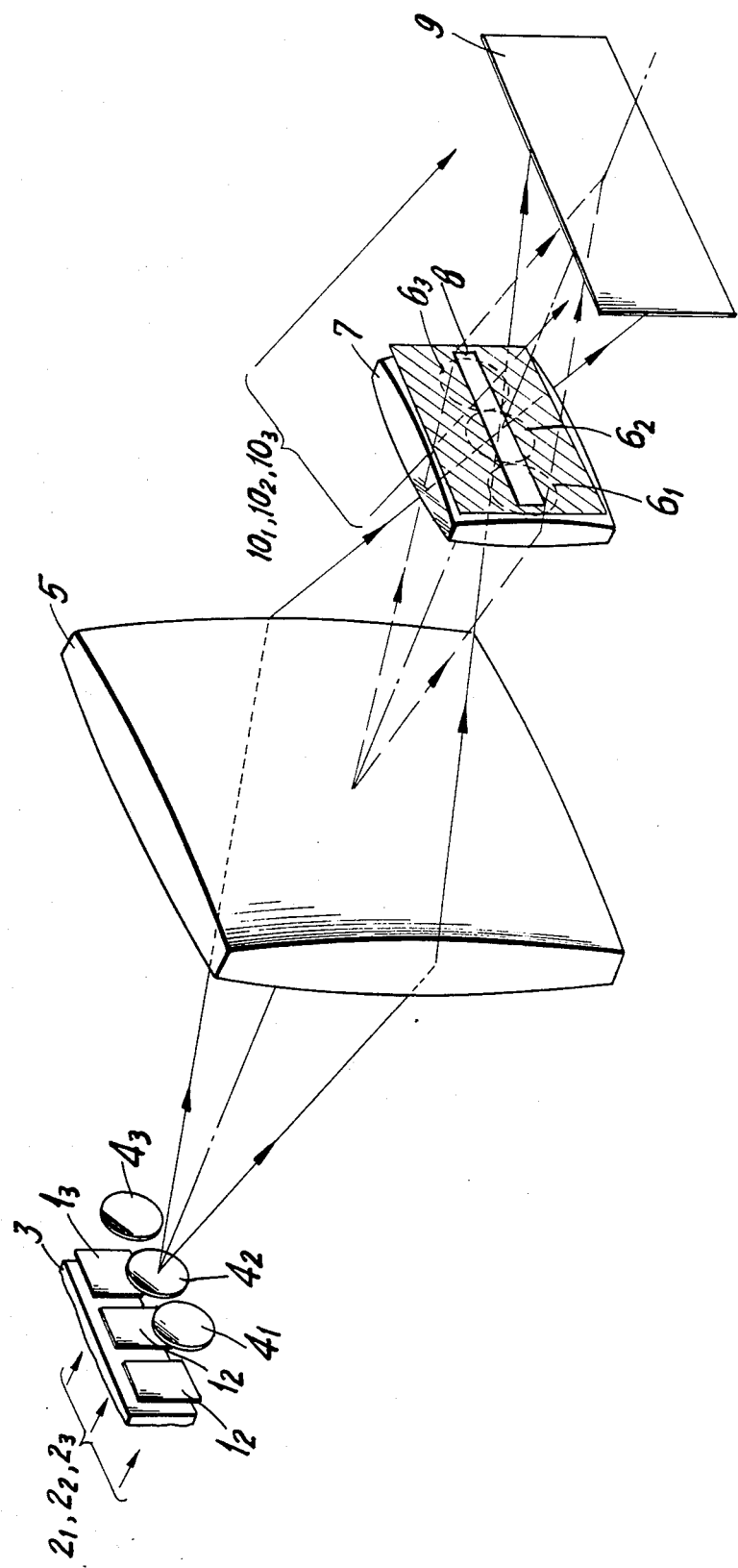
FIG. 1 is a perspective view showing a method for recording color focused image holograms in accordance with the present invention.

In FIG. 1, a hologram is made by illuminating three horizontally-arranged two-dimensional multi-color pictures $1_1$ to $1_3$ with mixed red, green, and blue coherent beams $2_1$ to $2_3$ through a diffusion plate 3. The color pictures $1_1$ to $1_3$, which in this case are in the form of multi-color transparencies or color slides, each contain an image of the same object from a different parallactic viewpoint.

Optical imaging systems $4_1$ to $4_3$ project the images from the pictures $1_1$ to $1_3$ upon a transparent screen 5. The latter is in the form of a large diameter lens screen which forms images $6_1$ to $6_3$ of the projection lenses $4_1$ to $4_3$ so that when the left and right eyes of an observer are placed at any two of the images $6_1$ to $6_3$, the observer can view the object of the pictures $1_2$ to $1_3$ three-dimensionally.

An imaging lens 7 at the positions $6_1$ to $6_3$ directs the light through an elongated aperture in a mask that covers the lens 7. The aperture is elongated horizontally parallel to the arrangement of the pictures $1_1$ to $1_3$. The lens 7 may be of the multi-element type and preferably the mask and aperture 8 should appear at the diaphragm plane of the lens. The imaging lens 7 focuses the images from the screen 5 upon or very close to a holographic recording plate 9.

Red, green, and blue coherent reference beams $10_1$ to $10_3$ form a vertical angle relative to the horizontal plane and interfere with the images focused upon the plate 9 to form a hologram. The plate 9 is transverse to the horizontal plane. As a result, the recorded images on the hologram are arranged horizontally.

Figure 3:
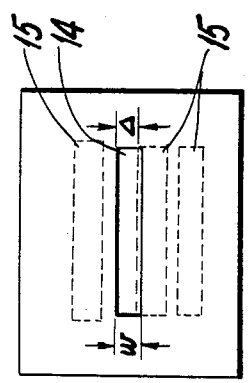
FIG. 3 is an elevation of a mask with an aperture for use in FIG. 2.
Figure 2:
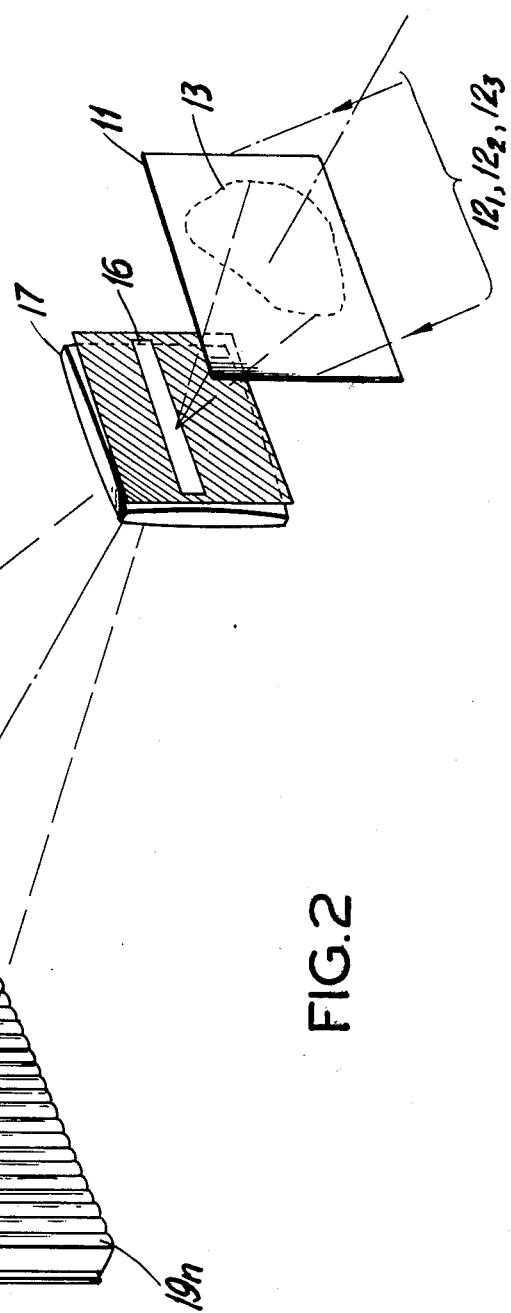
FIG. 2 is a perspective diagram showing a method for reconstructing the hologram of FIG. 1.
Figure 2:
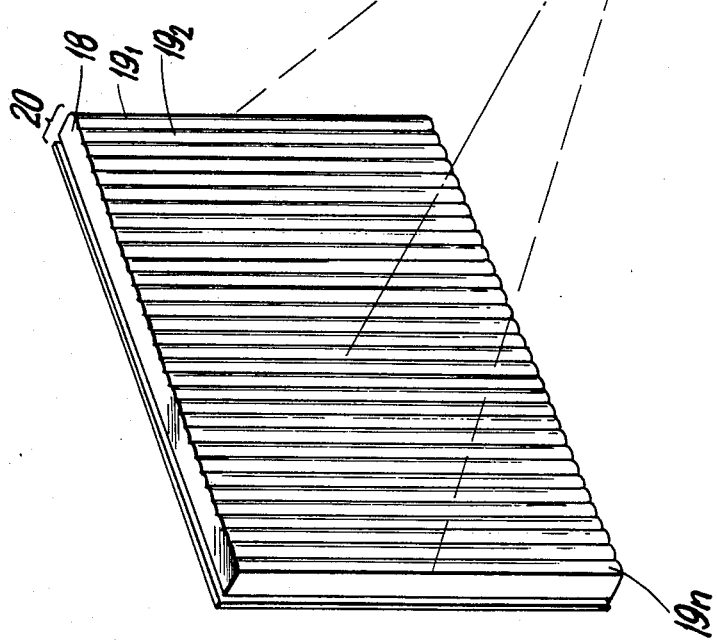

The image on the hologram is reconstructed by the reflection arrangement illustrated in FIG. 2. Here, the hologram 11 made from the medium 9 is illuminated by red, green, and blue reconstructing beams $12_1$ to $12_3$. A second mask with an aperture 16 transmits true color images from the hologram 11 while blocking cross-talk images. A projection lens 17 near the second mask projects the image onto a reflection type lenticular three-dimensional screen 20. The reconstructing beams $12_1$, $12_2$, and $12_3$ are quasi-monochromatic and extracted from a single white light source through an interference filter in a direction conjugate with the reference beam $10_1$ to $10_3$. When the hologram 11 is thus illuminated, a real image 13 of the object in the pictures $1_1$ to $1_3$ is reconstructed near the plane of the hologram 11. As shown in FIG. 3, a real and possibly magnified image 14 of the aperture 8 is reconstructed at the recording position. The reconstructing beams $12_1$ to $12_3$ reconstruct true and cross-talk images of the pictures $1_1$ to $1_3$ and true and cross-talk images 15 of the aperture 8. The true and cross-talk images of the pictures $1_1$ to $1_3$ are located near the plane of the hologram 11. Thus, there is little color shift due to the wavelengths of the reconstructing beams and the cross-talk images almost completely overlap the true images. However, the cross-talk images of the aperture 8 are spaced from the plane of the hologram 11. Thus they are reconstructed at a position spaced from the true aperture image. While the true aperture image 14 contains light only from the true object image 13, the cross-modulation image of the aperture contains the cross-talk image of the object.

The reconstructed cross-modulation image of the aperture 8 is shifted in a direction perpendicular to the horizontal alignment of the pictures $1_1$, $1_2$, and $1_3$, i.e., in the example shown, the vertical direction. The shift $\Delta$ of the cross-talk image 15 is determined by the distance between the hologram 11 and the reconstructed aperture image 14, the number of pictures, and the wavelength of the reconstructing beams. The relationship of these elements is set so that the value $\Delta$ is sufficient to prevent overlapping of the true and cross-talk image of the aperture, i.e. so that $\Delta \geqq$ height $\omega$. With such a relationship, the mask with the aperture 16 serves to block the cross-talk image 15. This eliminates the cross-modulation image.

By shifting the cross-modulation image of the aperture vertically, i.e., perpendicular to the arrangement of the original pictures, the true color can be displayed while the three-dimensional data, i.e. parallax, is retained.

An image projection lens 17, close to the aperture 16, and preferably at a location in which the aperture is in the diaphragm plane of the lens, projects the reconstructed image of the object onto a parallax screen 18 which is vertically dispersive and horizontally retroreflective. As shown, the screen is composed of a plurality of parallel contacting, vertically oriented, cylindrical lenses $19_1...19_n$ and a diffusion reflective surface at the focal plane 20 of the lenses. Since the lenses have no refractive power in the vertical direction, the incident light is diffused vertically. However, horizontally it is retroreflected. When the light forming image on the three-dimensional screen viewed through the lens 17 is reflected and returned, the information passing through the aperture 16 can be seen correctly. A three-dimensional view can be obtained whenever the eyes are placed near the vertical plane containing lens 17. That is, while the observation zone is determined by the size of the aperture 16 when the image from the hologram is directly viewed, the zone is substantially enlarged in the vertical direction by the apparatus of FIG. 2.

According to other embodiments of the invention, the lenticular screen may be replaced by other three-dimensional image screens, such as a fly's-eye lens screen, a corner reflector screen, a large diameter lens screen, and a large concave mirror screen. During recording the screen should have directivity both horizontally and vertically so as to provide a condensing action. During reconstruction, the screen should be vertically dispersive or diffusive and horizontally directive, e.g. horizontally retroreflective. In the recording situation, a point projected on the screen should appear as a point. In the reconstruction arrangement, a point source of light should ultimately result in a linear shape.

While a real image is reconstructed in the example shown above, similar results can be obtained with a virtual reconstructed image. Such a result arises in FIG. 4. Here a hologram 11 is illuminated by three color quasi-monochromatic light, e.g. red, green, and blue beams $21_1$ to $21_3$, having the same angle of incidence as the reference beam during recording, a virtual image containing cross-modulation is reconstructed near the hologram 11. A field lens 23 near the hologram and preferably within the plane containing the reconstructed image 22 of an object, produces a real image 25 of the reconstructed virtual image 24 of the aperture.

When a mask with a second aperture 16 and an imaging lens 17 are provided in the plane of the real image for removing the cross-modulation image, as in FIG. 2, and the reconstructed image is projected on a three-dimensional image screen, the result of FIG. 2 can be achieved.

Forming a real image of the aperture by means of a field lens from a virtual image reconstructed from a hologram has the same effect as directly reconstructing a real image. Therefore, hereinafter, the term reconstructing an image from a hologram includes both reconstructing a real image and reconstructing a vertical image which is then formed into a real image by a field lens.

Another embodiment of the present invention is shown in FIG. 5. Here, red, green, and blue coherent beams $2_1$ to $2_3$ illuminate pictures $1_1$ to $1_3$ through a diffusion plate 3. Projection lenses $4_1$ to $4_3$ project images of the pictures on a three-dimensional image displaying screen 5'. The screen 5' is a transmission type screen composed of a large diameter lens with a lenticular sheet having small, contacting, horizontal, cylindrical lenses on one face. This lens has directivity or image forming characteristics, in the horizontal direction while it is dispersive in the vertical direction. The vertically dispersive character arises from the cylindrical lens and reflective plane.

The three-dimensional image displaying screen forms images $6_1'$, $6_2'$, and $6_3'$ of the pupils of the projection lenses $4_1$ to $4_3$ but expands them vertically into three bands. When left and right eyes are placed at any two of the three bands an observer can obtain a three-dimensional view.

An imaging lense 7 is located at the position of the bands along with a mask with three slit shaped horizontal apertures 26R, 26G, and 26B having respective color filters mounted therein. The direction of the apertures is parallel to the direction of the arrangement of the pictures $1_1$ to $1_3$, that is, in FIG. 5, horizontally. The apertures with the filters are spaced from each other by the distances $l$ and $l'$. The remaining portions of the mask are opaque, and the transmission wavelength zone of each color filter is selected to pass only one color out of the colors of the coherent light beams, red, green, and blue. Preferably, the apertures 26R, 26G, and 26B should appear at the diaphragm position of the imaging lens 7. The screen 5' focuses an image on or near a dry holographic plate 9. The imaging wavefront interferes with red, green, and blue reference light beams $10_1$ to $10_3$ which form a vertical angle of incidence with the light from the imaging lens 7. The interfering waves are recorded on the plate 9 to produce an image hologram. By doing this, the direction in which the carrier is arranged on the hologram forms virtually a right angle relative to the vertical direction.

The system of FIG. 5 also serves for reconstruction. When three-color quasi-monochromatic lights $12_1$, $12_2$, $12_3$, extracted, for example, from a white light source through an interference filter, enter the hologram from a direction conjugate with the reference light beams $10_1$ $10_3$, the reconstructed image appears near the hologram plane. The images of the color filtered apertures are also regenerated. Cross-modulation images will occur along with the true object images and the true aperture images. The shift of the object image will be small as in FIG. 2 and that of the aperture image will be large. Shifting of the color filter aperture image is vertical, i.e. perpendicular to the arrangement of the pictures. For example, two cross-talk images are reconstructed almost above and below the true image 26R. The extent of the shift is determined by the distance S between the hologram and the color filter aperture 5, the number of pictures, and the wavelength of the regenerated light.

When these relationships are selected so that the extent of the shift is a predetermined value compared to the vertical opening of the true color filter aperture image and is smaller than the distance $l$ between the color filter aperture, only the real color images are transmitted. The cross-talk aperture image is blocked. This is accomplished by providing the second aperture with a suitable vertical opening in the reconstruction arrangement.

The cross-modulation images of the green and blue reconstructed images are blocked out similarly by means of the mask with additional apertures. Thus, the true color information can be transmitted. At the same time, the color data separated vertically is mixed by a vertically diffusive screen. In this manner, the color image is reconstructed. While the same aperture is used in the recording and reconstructing system, the size of the second aperture to pass the real aperture image is determined basically upon the size of the reconstructed aperture image. When white light is used as a reconstructing beam, color filters having wavelength transmission zones corresponding to the three quasi-monochromatic lights red, green, and blue are mounted in the three apertures. This produces the same results as with three different beams.

The observation screen does not have to be the same as the one used during recording. Any screen having directivity in one direction and diffusing in a direction perpendicular thereto can be used in place of the lenticular screen 5'. Other three-dimensional screens may be used in the recording system. Preferably, screen having directivity in one direction and diffusing in the other be used in recording and reconstruction.

By virtue of the invention, color focused-image holograms can be formed from a number of parallactically related pictures in one exposure, and the images may be reconstructed from the hologram with white light. Moreover, large three-dimensional images can be observed over a wide observation zone.

According to another embodiment of the invention, image holograms are synthesized from a plurality of groups of three-dimensional pictures in which, for example, one picture has a red component image, one picture a green component image, and one picture a blue component image. According to this embodiment, in FIG. 1, a three-dimensional red component picture is illuminated with a red monochromatic laser beam. Image holograms are made in the same manner as in FIG. 1. Similarly, three-dimensional green component and blue component pictures are recorded on the image hologram in a multiple exposure. Reconstructions is done in the same manner as in FIG. 2.

According to another embodiment of the invention, a three-dimensional red component picture is arranged as shown in FIG. 4 and illuminated with a monochromatic laser beam. An aperture transmits only that part of the light which corresponds to the rectangular color filter aperture 26R in FIG. 5. This is recorded with a red reference beam to form an image hologram. Similarly, using a three-dimensional green color component picture and a green filtered aperture 26G with a green reference beam produces a multiple exposure on the plate 9. The same is done for a blue picture. The hologram is reconstructed in a manner similar to the example with respect to FIG. 5.

As has been explained, focused-image holograms can be recorded using monochromatic laser beams and reconstructed using white light.

The term screen used herein is used generically to refer either to a transmissive or reflecting screen and regardless of its diffusing capability.

While embodiments of the present invention have been limited to cases where a number of pictures having three-dimensional information are used, it is apparent that the invention can be applied to dissimilar pictures with different objects, or pictures representing moving objects.

It will also be evident that other embodiments of the invention would be obvious to those skilled in the art.

What is claimed is:

1. A method for recording and reconstructing a color focused image hologram, comprising a recording step and reconstructing step, said recording step including, arranging a plurality of two-dimensional multi-color pictures along a predetermined line, illuminating said plurality of two-dimensional multi-color pictures with coherent light beams having mutually different wavelengths, projecting images of the pictures on a screen which focuses in a direction parallel to said predetermined line, transferring a plurality of projection images formed on the screen to a holographic recording medium using an image-forming lens, placing a masking member having an elongated aperture between the screen and the medium, orienting the elongated dimension of the aperture parallel to the predetermined line, and directing reference light beams having mutually different wavelengths to the medium so as to record the hologram and so that the plurality of two-dimensional multi-color pictures are recorded as focused image holographic recordings and the masking member is recorded as a Fresnel holographic recording, and so that the recordings produce color dispersion greater in a direction in the plane of the hologram transverse to the predetermined line than in the direction parallel thereto, said reconstructing step including directing reconstruction beams having mutually different wavelengths onto the hologram so as to reconstruct both true color images and color cross modulation images of the plurality of two-dimensional pictures in the plane of the hologram, and at the same time, reconstruct both true color images and color cross modulation images of the masking member remote from the hologram, and placing a light blocking member having an elongated aperture so as to block said color cross modulation images of the masking member.

2. The method according to claim 1, in which the masking member defines a plane and said image-forming lens is placed in the plane of said masking member.

3. The method according to claim 1, in which said plurality of two-dimensional multi-color pictures are illuminated through a diffusion plate.

4. The method according to claim 1, wherein said masking member has a plurality of elongated apertures and each elongated aperture has a different color filter.

5. A method for recording and reconstructing a color focused image hologram, comprising a recording step and reconstructing step, said recording step including:

arranging a plurality of two-dimensional multi-color pictures along a predetermined line, illuminating said plurality of two-dimensional multi-color pictures with coherent light beams having mutually different wave-lengths, projecting images of the pictures on a screen which focuses in direction parallel to said predetermined line, transferring a plurality of projection images formed on the screen to a holographic recording medium using an image-forming lens, placing a masking member having a plurality of apertures, each having a different color filter between the screen and the medium, and directing reference light beams having mutually different wave-lengths onto the medium so as to form the hologram and so that the plurality of two-dimensional pictures are recorded as focused image holographic recordings and the masking member is recorded as a Fresnel holographic recording, said reconstructing step including directing reconstructing beams having mutually different wavelengths onto the hologram so as to reconstruct both true color images and color cross modulation images of the plurality of the two-dimensional pictures, and at the same time, to reconstruct both true color images and color cross modulation images of the masking member remote from the hologram, whereby said color cross modulation images of the masking member are separate from said true color reconstructed image of the masking member, and locating a light blocking member having a plurality of apertures, each having a different color filter so as to block the color cross modulation images of the masking member.

6. The method according to claim 5, wherein the apertures of the masking member and blocking member are elongated.

* * * * *